United States Patent
Faulkner et al.

(10) Patent No.: US 10,666,692 B2
(45) Date of Patent: May 26, 2020

(54) TELECOMMUNICATIONS DIRECTORY SERVICES

(71) Applicant: Truphone Limited, London (GB)

(72) Inventors: Robert Faulkner, London (GB); James Tagg, London (GB); Adam Linford, London (GB)

(73) Assignee: Truphone Limited, London (GB)

( * ) Notice: Subject to any disclaimer, the term of this patent is extended or adjusted under 35 U.S.C. 154(b) by 0 days.

(21) Appl. No.: 15/319,654

(22) PCT Filed: Jun. 17, 2015

(86) PCT No.: PCT/GB2015/051770
§ 371 (c)(1),
(2) Date: Dec. 16, 2016

(87) PCT Pub. No.: WO2015/193663
PCT Pub. Date: Dec. 23, 2015

(65) Prior Publication Data
US 2017/0134445 A1    May 11, 2017

(30) Foreign Application Priority Data

Jun. 17, 2014  (GB) .................................. 1410740.3

(51) Int. Cl.
| H04L 29/06 | (2006.01) |
| H04L 29/12 | (2006.01) |
| G06Q 50/00 | (2012.01) |
| H04L 29/08 | (2006.01) |

(Continued)

(52) U.S. Cl.
CPC ........ *H04L 65/1076* (2013.01); *G06Q 50/01* (2013.01); *H04L 61/1594* (2013.01); *H04L 65/1069* (2013.01); *H04L 65/1073* (2013.01); *H04L 67/306* (2013.01); *G06F 16/9024* (2019.01); *G06F 16/951* (2019.01)

(58) Field of Classification Search
CPC ............ H04L 65/1076; H04L 61/1594; H04L 65/1073; H04L 65/1069; H04L 67/306; H04L 2012/64; H04L 12/64; H04L 65/102; H04L 29/06176; H04L 12/6481
See application file for complete search history.

(56) References Cited

U.S. PATENT DOCUMENTS

| 6,075,851 A | 6/2000 | Pinard |
| 8,983,440 B1 * | 3/2015 | Saylor .................... H04W 4/16 |
| | | 455/415 |
| 2005/0171954 A1 * | 8/2005 | Hull ........................ H04L 51/32 |

(Continued)

FOREIGN PATENT DOCUMENTS

| CN | 102984061 | 3/2013 |
| WO | WO2006104706 | 10/2006 |

*Primary Examiner* — Brenda H Pham
(74) *Attorney, Agent, or Firm* — EIP US LLP

(57) ABSTRACT

A method and service for enabling routing of calls to a user is described. Connection rules for a user are established, and organisational or social network data is obtained from the user for use in determining a social network connection graph. On receiving a request to route a call to the user with organisational or social network data associated with the caller, a matching directory service (1) determines from the social network connection graph and the connection rules whether or how to provide call routing data in response to the request.

12 Claims, 5 Drawing Sheets

(51) Int. Cl.
*G06F 16/951* (2019.01)
*G06F 16/901* (2019.01)

(56) References Cited

U.S. PATENT DOCUMENTS

| | | | |
|---|---|---|---|
| 2009/0080635 A1* | 3/2009 | Altberg | G06Q 30/02 |
| | | | 379/216.01 |
| 2009/0086720 A1* | 4/2009 | Westlake | H04L 12/66 |
| | | | 370/352 |
| 2009/0310768 A1 | 12/2009 | Hansen | |
| 2010/0203909 A1 | 8/2010 | Oldach | |
| 2012/0195234 A1 | 8/2012 | Cai | |
| 2015/0163354 A1* | 6/2015 | Nezarati | H04M 3/42042 |
| | | | 379/142.04 |

\* cited by examiner

Verify you know Name here

TELECOMMUNICATIONS DIRECTORY SERVICES

CROSS REFERENCES TO RELATED APPLICATIONS

This application claims priority to international application number PCT/GB2015/051770 filed on Jun. 17, 2015 which claims priority to British patent application number 1410740.3 filed on Jun. 17, 2014, the entire disclosures of which are hereby incorporated by reference.

FIELD OF THE INVENTION

The invention relates to telecommunications, and particularly to directory services to support the making of voice calls.

BACKGROUND TO THE INVENTION

In traditional telecommunications, a user relies on contact management applications on his or her devices to store numbers of known contacts and directory services online or elsewhere to provide numbers for others.

There are a number of difficulties with this paradigm. Telephone numbers (particularly mobile telephone numbers) often change, rendering contact databases out of date, and there is generally no consistent way for such contact databases to be updated. Direction of calls within an organisation is often problematic, particularly for callers from outside an organisation. Such callers are typically routed through interactive voice menus—these increase call time and cost and are unpopular with callers. The lack of standard messaging clients means that interaction between employees of one company and another may be problematic.

Methods to establish voice calls between users have developed beyond traditional wired and wireless circuit-switched network telephony. Voice calls are increasingly made over any available internet protocol network (such as the Internet) using Voice over Internet Protocol (VoIP). A new approach to establishing voice calls between browsers is WebRTC (Web Real-Time Communication)—this is an API definition drafted by W3C to support browser-to-browser applications for voice calling and other user to user communications. This approach allows for direct calling between users within browser-based applications. Further details of WebRTC may be found at http://www.webrtc.org/.

It would be desirable to improve upon the conventional contact management and directory approaches to enable calls to be routed more effectively where direct contact information is either unavailable or likely to be out of date.

SUMMARY OF INVENTION

In a first aspect, the invention provides a method of enabling routing of calls to a user, comprising: determining social network connections for a user from organisational or social network data; establishing connection rules for the user; and on receiving a request to route a call to the user with organisational or social network data associated with the caller, determining from the social network connections and the connection rules whether or how to provide call routing data in response to the request.

Preferably, the social network connections for the user are used to determine a social network connection graph, and the social network connection graph is used with the connection rules to determine whether or how to provide call routing data in response to the request.

The present inventors have appreciated that social network data may be a particularly useful resource for determining whether, or how, a user will wish to receive a call. From a user's social network connections, it is possible to make effective decisions relevant to the current state of the user as to whether or not the user will wish to receive a call from a called party, and will wish a caller to have a continuously usable number for the user. This approach can be used with organisational data in the same way as for social network data to enable effective routing of calls into organisations and even within organisations.

Preferably the social network connection graph is constructed from the user's organisational or social network data and the organisational or social network data associated with the caller. This is thus a real-time action.

If the user is a member of an organisation the organisational data may contain one or more of a functional role and membership of a team. If the request is to contact a functional role within the organisation, the matching directory service may provide call routing data to route the call to a user with that functional role.

The request may include social network data associated with the caller, and if so the social network connection graph is preferably constructed from the user's social network data and the caller's social network data.

In some cases the matching directory service provides a permanent contact number to the caller if criteria set by the connection rules are met. In other case, the matching directory service provides a one-time call number to the caller if criteria set by the connection rules are met—this preservation of anonymity may provide significant privacy benefits to the user. Preferably the matching directory service does not provide any number to the caller if insufficient criteria set by the connection rules are met, but it is desirable if the matching directory service does not provide any number to the caller, that the caller is requested to leave a message that is subsequently forwarded to the user.

In a second aspect, the invention provides a method of registering a user with a matching directory service, comprising: providing a number for receiving calls from callers, and providing organisational or social network data associated with the user for use in constructing a social network connection graph; and providing rules to determine whether or how a connection should be made according to how the matching directory service matches the caller using the social network connection graph.

Preferably the method comprises enabling some or all callers to contact the user by a one-time call number. The method may also comprise providing user data for public display in a matching directory service public directory.

In a third aspect, the invention provides a matching directory service comprising a server and a database, wherein the server has a programmed processor adapted to: collect user details for storage in the database, the user details comprising a number for receiving calls from callers, and organisational or social network data associated with the user, and further collecting rules to determine whether or how a connection should be made according to how the matching directory service matches the caller; receive number requests from callers, the number requests comprising organisational or social network data associated with the caller; determining a social network connection graph associated with the user; and establishing how the caller matches the user using the social network connection graph and determining whether or how to provide call routing data in response to the request.

In a fourth aspect, the invention provides a method of routing a voice or video call, comprising: receiving a call request from a caller identifying a called party; confirming that the caller and the called party are both members of the same social network and confirming that the caller and the called party are connected on the social network; and accepting the call request and routing the voice or the video call from the caller to the called party if a connection on the social network between the caller and the called party satisfies a connection rule.

BRIEF DESCRIPTION OF DRAWINGS

Specific embodiments of the invention will be described below, by way of example, with reference to the accompanying drawings, of which.

DETAILED DESCRIPTION OF PREFERRED EMBODIMENTS

Figure 1:
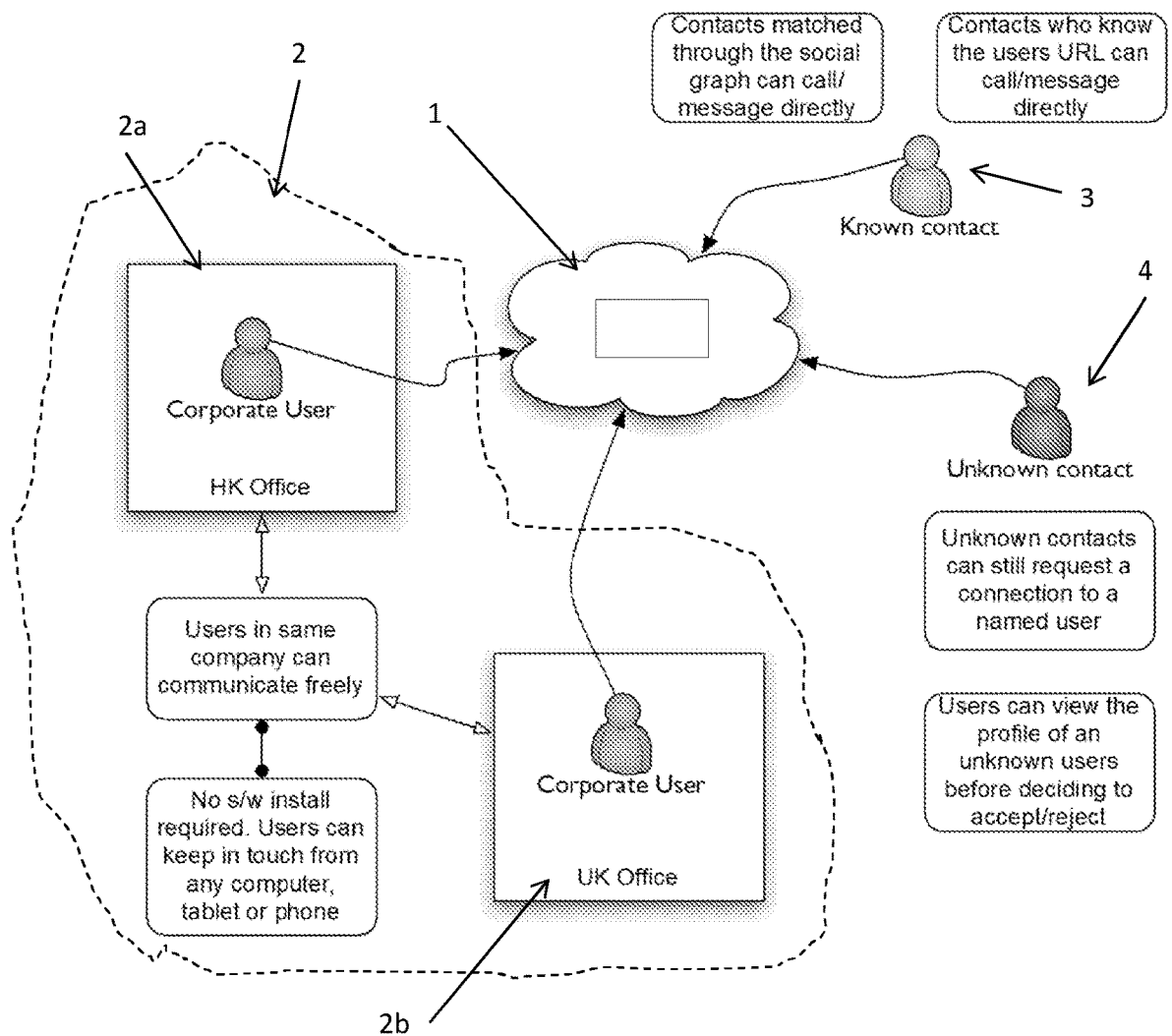
FIG. 1 shows a system for providing call routing data according to embodiments of the invention.

FIG. 1 shows a system for providing call routing data according to embodiments of the invention. Central to the system is a matching directory service 1 that obtains information from users to determine which incoming call requests should be routed to them and determines how this should be done, and which answers requests from callers to members of the matching directory service accordingly. This matching directory service 1 may also provide call routing—in particular, it may be used to provide browser-to-browser routing using WebRTC—relevant protocols are available from http://www.webrtc.org/. In other embodiments, the matching directory service may simply provide routing information (such as a number) for use in a separate telephony application. The discussion of calls below is directed essentially to voice communication—however, this discussion is equally relevant to other similar forms of communication (for example, it is equally relevant to video calls).

Various parties interacting with the matching directory service 1 are shown. A corporate network 2 of an organisation may have its directory (or a version of its directory) in the matching directory service 1. As is discussed below, this directory may comprise business roles and call groups representing business functions—it will be populated with corporate user numbers and also with organisational network data associated with these user numbers. Two corporate users 2a, 2b in different offices are shown. As is discussed in more detail below, the matching directory service 1 may be used for communication within the organisation, and to route calls into the organisation from outside. This approach allows for free and effective communication within the organisation, while allowing for a richer approach for communication into the organisation than is provided by the conventional set of direct dialling, reception numbers and interactive voice menus. Use of a browser-based approach further allows for users to communicate directly from any convenient device without need for additional software installation.

The matching directory service 1 may also have direct subscribers, such as known contact 3. As described below, such known contacts will register with the matching directory service 1 and will provide social network data on registration. Known contacts 3 will typically have a direct dial number (this may be a specific URL, in a WebRTC implementation) circulated to their favoured contacts allowing direct dialling—for other callers to the known contact 3, a social network connection graph is constructed directly or indirectly from the social network data provided by the known contact 3. This social network connection graph is used in a matching process to determine whether (and if so, how) incoming calls should be routed to the known contact 3.

In the case of corporate users, a social network connection graph is constructed in a similar way, though this is typically from organisational network data rather than social network data (though a combination of the two is possible). Use of organisational network data in this way allows for efficient routing of calls into an organisation to the correct organisational function or job role. Further details of these different use cases are provided below.

For an unknown contact 4, the main point of contact with the matching directory service 1 will be an attempt to contact a user (or a function) in a corporate network 2 or a known contact 3. The unknown contact 4 may have a direct dial number for the called party, in which case the call may be routed directly. If the unknown contact 4 does not have a direct dial number, the unknown contact 4 needs to provide sufficient information to allow the called party to be identified—the matching directory service 1 will generally provide a search or listing service to allow the unknown contact 4 to identify a called party in this way. The unknown contact 4 may then need to provide organisational data (such as a function within the organisation) or social network data (to establish a relationship with the called party) for use with the social network connection graph in the matching process.

Figure 2:
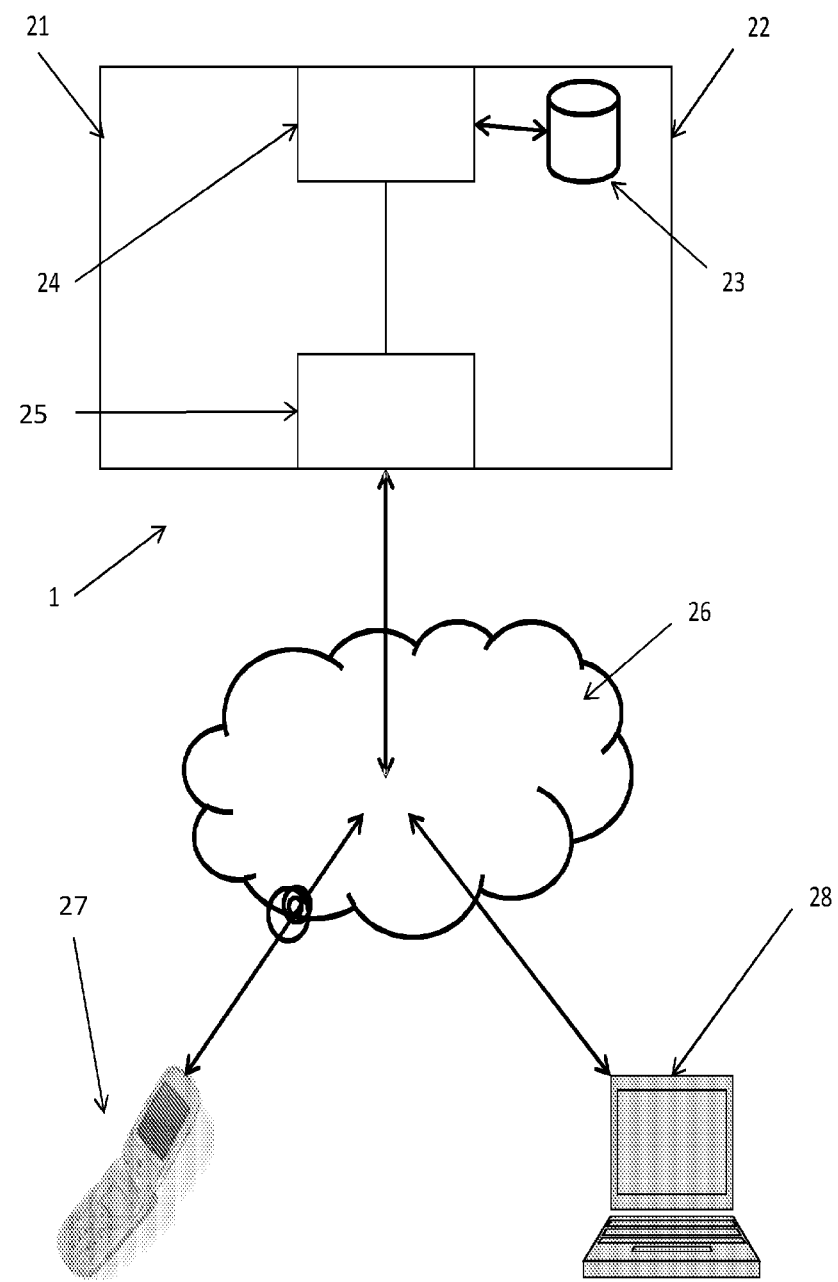
FIG. 2 shows schematically an implementation of a matching directory service according to an embodiment of the invention and its interaction with users.

FIG. 2 shows schematically an implementation of the matching directory service and its interaction with users. The matching directory service 1 is typically implemented as a server or a series of servers, comprising one or more processors 21 and one or more memories 22 (shown here as a single processor 21 and a single memory 22 for convenience), the processor 21 being adapted to run software 24 to implement the service and the memory containing the software and the user data and associated organisational data and social network data in a database 23.

The matching directory service 1 is able to contact a communications network, preferably an Internet Protocol network such as the public Internet. The matching directory service 1 comprises at least a web server 25 which can be accessed by users, together with a calling agent or a means to provide call routing data to users to allow calls to be made from user to user without routing through the matching directory service 1. This web server 25 may be used to provide direct access to the matching directory service, or indirect access (for example, via a search box on an organisation website when the organisation is a customer of the matching directory service). An IP connection is shown through the public Internet 26 to generic users—a user may for example access the matching directory service 1 from a smartphone 27 or a personal computer 28.

The use of this service for an organisation providing organisational data and a known user providing social network data will now be described in more detail below, together with a description of a matching process.

There are several benefits for a customer if an organisation uses a matching directory service of this type. Conventionally, organisations publish functional phone numbers (for sales, customer services etc.) with either an interactive voice response (IVR) system to enable the call to be routed, or simply by publication of enough numbers and guidance that the caller is likely to pick the correct number. This is even more problematic for international organisations, as customers may be forced to make international calls or may struggle to find local numbers from a company website localised to the customer's local market.

These issues can be addressed if the organisation creates groups registered with the matching directory service. Individual users in the organisation can be added to a group according to their functional role within the organisation. When the group is called, routing rules will try to connect the call to the first user to be identified as available within the group, to users in a defined order, or by a parallel "ring all" process with the first user to answer connected. Groups may be treated effectively as an address book entry, and company websites can contain menus to allow direct customer connection with a group.

Incoming calls intended for a specific individual can be managed without the need for a dedicated receptionist, even when the caller does not know a direct dial number for the individual. A search box on an organisation's website can be used as a way to search the organisation's entries in the matching directory service. A caller could enter any known details they have about the contact that they wish to call. The matching directory service could then provide a list of all organisational contacts matching those criteria, listing whatever subset of the organisational and personal data of those contacts that the contacts choose to make public on their profile. The caller can then click the contact that her or she wishes to call.

Calling an individual from outside the organisation may require a degree of validation—this will preferably be chosen by the individual directly. An exemplary set of levels of required validation is as follows:

None—any caller can contact such an individual directly
Authenticated only—all calls from anonymous callers will be rejected
Loose match—if any previous social connections can be found (e.g. social networking site TWITTER following, previous email exchange, contact book match, etc.), the call will be allowed
Explicit match—Caller must fulfil a specific criteria e.g. $1^{st}$ degree contact on social networking site LINKEDIN or friends on social networking site FACEBOOK If a caller does not match the criteria set by the user they will be given the option to leave a voice or text message. There may also be "higher" and "lower" criteria set—if the higher set of criteria are met, the caller may be provided with a permanent number for the user, whereas if only the lower set of criteria are met, the caller may only be provided with a one-time number valid for that call alone. This may be used to preserve the security of users, particularly if their contact number is one used for both organisational and private purposes.

A more sophisticated matching process weighing the contributions from multiple sources is described later with reference to FIG. 3.

Individuals may be allocated a direct number (which may for example be a dedicated URL—either one associated with the organisation or with the matching directory service) that allows calls to be routed directly to them. This organisation administrator will allocate a telephone number to the user, but these need not be associated with any specific physical device (even though the user can be called directly on this number and the number can be that shown on Caller Line Identification (CLI)). The organisation may assume responsibility for costs associated with calls from this number, even if the calls are physically made from apparatus owned by the user rather than the organisation.

This approach is also effective for team-based collaboration within organisations. In the same way that the organisation can enter a function in the matching directory service, it can create and enter a team of individuals. Users can be selected to join the team, and typically invited by e-mail—in responding, individual accounts with the matching directory service may be identified or created. One or more phone numbers can be created for the team. Features of such team accounts are as follows:

Team members can browse the directory for other team members, and team members will be classified as having a first degree connection in social network matching;
Team members may be able to make calls on behalf of the team, and charges may be met from a team account;
Users may be members of multiple teams (and may have multiple functions within an organisation, and may in principle be members of multiple organisations);
Users within a team may be able to create further ad hoc groups (this may also be enabled to be possible across a whole organisation); and
Users within a team are able to conference call across the team (the team in some senses acts as a permanent conference call to which any team member can dial in at any time).

In the cases indicated above, individual users can have access to a virtual number from which they may make outbound calls from the company network. In these cases, there may need to be a mechanism for payment. This could be, for example, a "wallet" allocated to an individual user, or to a team account. This could be for example a fixed or unlimited pre-paid or post-paid balance to a user account. Such a wallet will typically be associated with a given phone number—the phone number associated with a wallet may be used to receive calls from the PSTN. A user may have multiple such wallets (if, for example, they are a member of multiple organisations) and may then need to select which wallet to use when making an outbound call.

For a personal user, many of the same criteria apply, but social network connection data is important, while organisational data may not be (though it is possible for a personal user also to be a user as a member of an organisation, and for the user to be contactable as a personal user and as an organisational user under different search criteria). The personal user will again choose which of their details to make available for public view on the matching directory service. The personal user must register with the matching directory service. In the process of registration, as the user establishes a contact number and personal details to be made available for public view—in embodiments, even this information may be restricted to members of the same social network. In addition, the personal user must provide social media connections (accounts with social networking site TWITTER, social networking site FACEBOOK, social networking site LINKEDIN and so on) together with such information as is needed to allow the matching directory service to discover the connections to the user with that social media service, and the strength of those connections. Strength of connection may involve directness (for example, level 1 connections on social networking site LINKEDIN are more direct than level 3 connections—social networking site FACEBOOK "friend" status may be taken as a direct connection) and may involve frequency of communication. As is discussed above, different degrees of validation may be provided and permanent or one-time call numbers may be provided according to whether the caller meets desired criteria.

Figure 4:
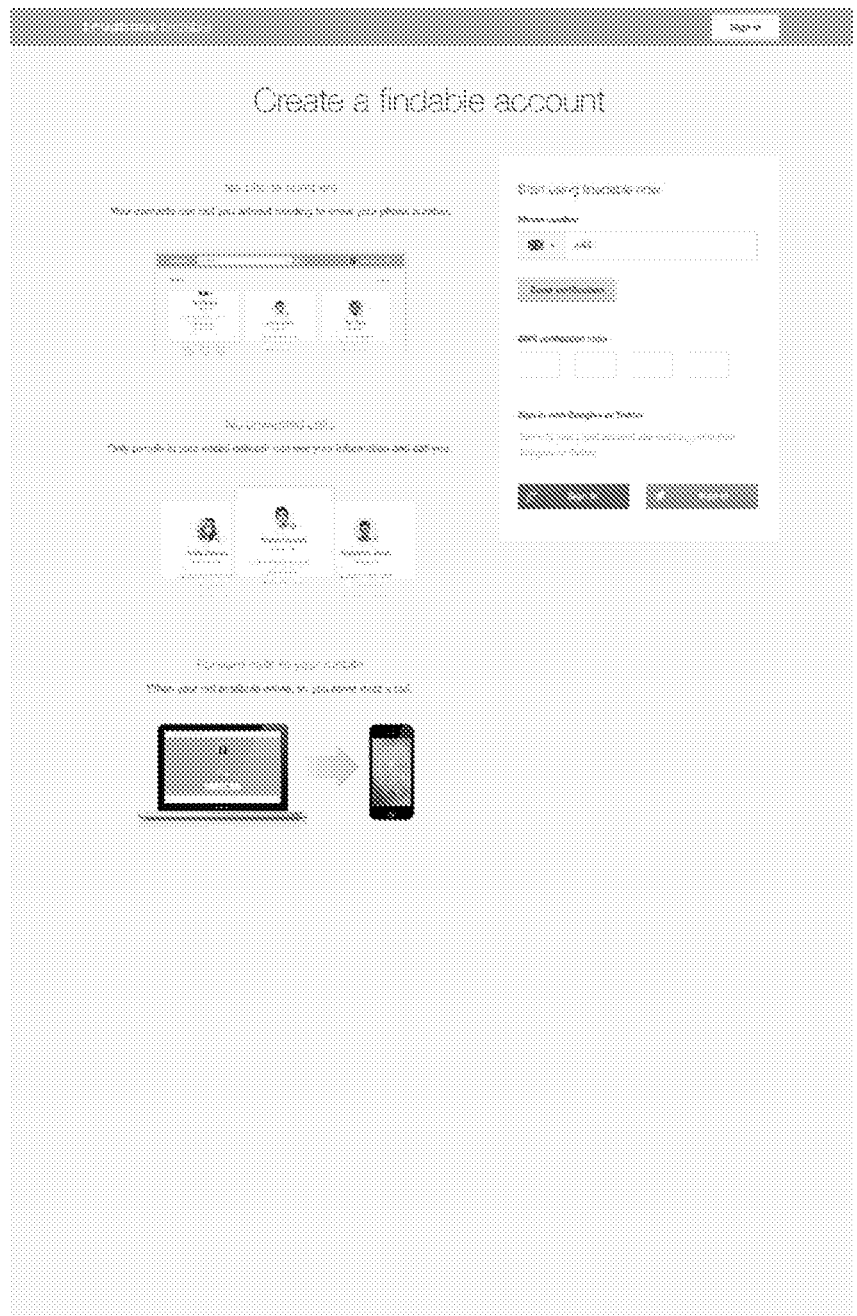
FIG. 4 shows a user interface screen for user registration with the matching directory service of embodiments of the invention.

FIG. 4 shows a user interface screen for an exemplary registration process. The screen shows benefits of the account on the left (it enables contacts to make calls to you without your telephone number, and in this embodiment it restricts any of your information to people within your social network. To register, the user enters their phone number and verifies this through a standard SMS verification process, and also signs in to any relevant social networks (in this case, social networking site GOOGLE+ and social networking site TWITTER) to associate the user's matching directory service account with those social media accounts.

In making a call, an anonymous user (outside the system) may search for an individual to call using the public data provided and may then request the matching directory service to provide connection data by offering one or more pieces of social network connection information (this may be simply an indication of social network accounts for which there is a friend connection between the caller and the prospective called party). The matching directory service may require some kind of authentication process to establish that the called party is genuinely associated with the identified social network accounts. This approach also applies if the caller is a registered user of the matching directory service—social connection data is still needed if the prospective called party is not in the same organisation as the caller, but as both parties have provided their social network data on registration, no further information is required by the matching directory service to carry out the next step. Where the matching directory service provides call routing (which may be done browser-to-browser using WebRTC), this enables one user of a social network to make a voice or video call to another member of that social network without having a telephone number for the called party, provided that the caller is sufficiently well connected to the called party. Such a call takes place outside the social network itself (i.e. it does not take place "in-app" within, say, social networking site FACEBOOK or social networking site TWITTER) but the matching directory service relies on social network information in determining whether to allow the call.

To determine whether there is a match present, the user's social network data is organised in the form of a social network connection graph. Whereas the user's basic social network data (account details) may be provided on registration, it is desirable for their connections, and thus their social network connection graph, to be established at or near to the time of the call, as connection data may change considerably over time. In principle, a social network connection graph may be constructed from the user's social network data alone. In practice, it is preferred to construct the social network connection graph from the user's social network data and the social network data provided by the caller, and for a fresh social network connection graph to be generated for each call for use in the subsequent matching process. The social network connection graph may be used to combine the results from multiple social networks to provide an overall ranking.

Figure 5:
FIG. 5 shows a user interface screen for an unregistered user to confirm connection with a potential called party according to embodiments of the invention.
Figure 5:
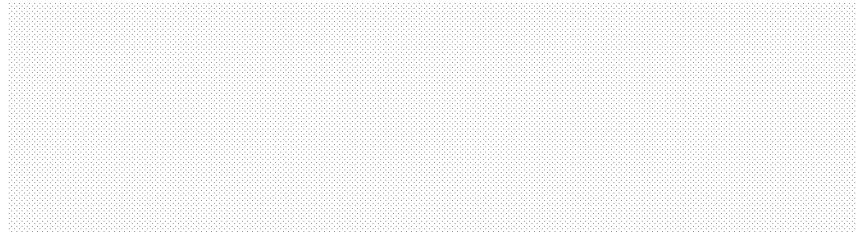

An unregistered user without a direct access number for a registered user of the service will then access the matching directory service directly or indirectly to attempt to contact the registered user. In the case of an organisational user, the unregistered user may be required to provide organisational data (such as identification of a company function) and for a private registered user, the unregistered user will be required to provide social network data to allow the matching directory service to establish whether there are connections. FIG. 5 provides an example of how this may be done. The user is provided with a screen that provides options to sign in to relevant social media account (in this case, social networking site GOOGLE+ social networking site TWITTER). Once signed in, user messaging can be used to establish that there is a genuine connection.

The matching directory service then determines whether there is a sufficient match by generating using a social network connection graph and using it to determine a ranking. If the ranking is sufficiently high, the matching directory service provides the unregistered user with information allowing a connection to be made to the user. Preferably, the matching directory service also invites the unregistered user to register with the matching directory service.

Figure 3:
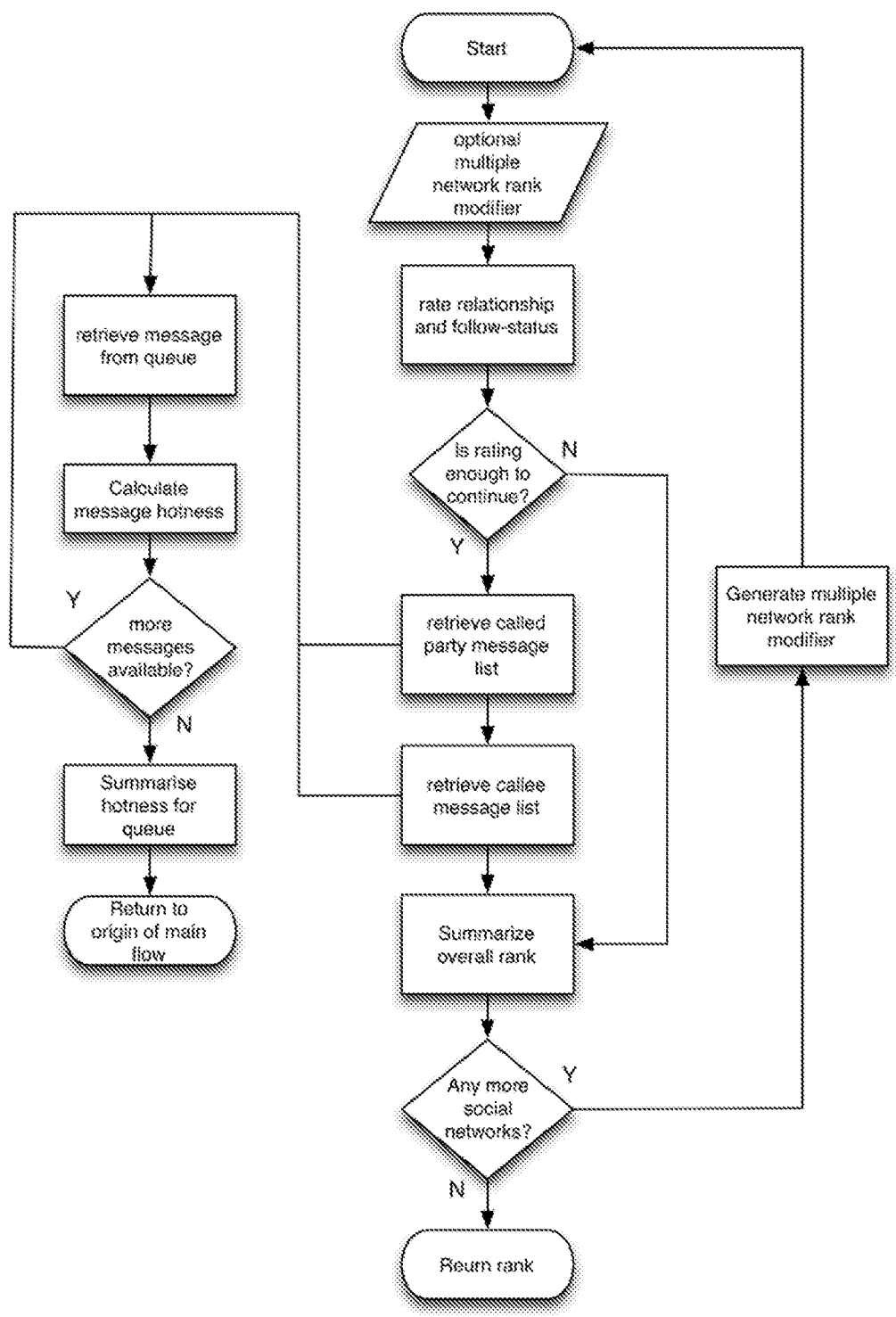
FIG. 3 shows a flow diagram for a scoring algorithm for use in social network matching in embodiments of the invention.

A basic matching process was described above—a more sophisticated matching process for social network connections, including contributions from multiple social networks, is shown in FIG. 3. This approach may be used for multiple social networks. At the start, there may be an optional pre-ranking of networks (for example, social networking site LINKEDIN or social networking site FACEBOOK direct connections may be weighted more highly than social networking site TWITTER followers). An initial rating determines whether further analysis is needed for that social connection (the process may be abandoned for that social network if the connection between the parties is too indirect, for example). If the rating is sufficient to continue, recent messaging may be analysed to determine how "hot" the connection between the parties is, and this can be used to generate a ranking for this social network. Data from other social networks may be analysed in the same way, and this used to determine an overall ranking across all social networks used.

As the person skilled in the art will appreciate, the embodiments described here are exemplary, and other embodiments may be developed within the spirit and scope of the invention as claimed.

The invention claimed is:

1. A method of enabling routing of calls to a user, comprising:
  determining social network connections for a user from organisational or social network data;
  establishing connection rules for the user, said connection rules comprising different levels of authority based on the social network connections;
  on receiving a request from a caller to enable routing of a call to the user with organisational or social network data associated with the caller, determining from the social network connections and the connection rules whether or how to provide call routing data in response to the request; and routing the call between the user and the caller, if it is determined that it is proper to do so according to the connection rules, in a manner according to the connection rules, wherein the step of determining whether or how to provide call routing data comprises selecting between a plurality of connection request outcomes, the outcomes including:

providing a permanent contact number to the caller; and providing a one-time call number to the caller.

2. The method as claimed in claim 1, wherein the social network connections for the user are used to determine a social network connection graph, and the social network connection graph is used with the connection rules to determine whether or how to provide call routing data in response to the request.

3. The method as claimed in claim 1, wherein a social network connection graph is constructed from the user's organisational or social network data and the organisational or social network data associated with the caller.

4. The method as claimed in claim 1, wherein the user is a member of an organisation, and the organisational data contains one or more of a functional role and membership of a team.

5. The method as claimed in claim 4, wherein the request is to contact a functional role within the organisation, and a matching directory service provides the call routing data to enable routing of the call to a user with that functional role.

6. The method as claimed in claim 4, wherein the request includes social network data associated with the caller, and a social network connection graph is constructed from the user's social network data and the caller's social network data.

7. The method as claimed in claim 1, wherein neither a permanent number nor a one-time call number is provided to the caller and the call is not routed if insufficient criteria set by the connection rules are met.

8. The method as claimed in claim 7, wherein if neither a permanent number nor a one-time call number is provided to the caller, the caller is requested to leave a message that is subsequently forwarded to the user.

9. A method of registering a user with a matching directory service, comprising:

providing a number for routing calls from callers to the user, and providing organisational or social network data associated with the user;

determining social network connections for the user from the organizational or social network data associated with the user; and providing rules to determine whether or how a call from a caller should be routed to the user according to how the matching directory service matches the caller to the user using a social network connection graph, the social network connection graph being determined using the social network connections, and said rules comprising different levels of authority based on the social network connections, wherein the matching directory service is configured to route a call from the caller to the user if it is determined that it is proper to do so according to the rules, in the manner according to the rules, and wherein determining whether or how a call from a caller should be routed to the user comprises selecting between a plurality of connection request outcomes, the outcomes including:

providing a permanent contact number to the caller; and providing a one-time call number to the caller.

10. The method as claimed in claim 9, wherein the method further comprises providing user data for public display in a matching directory service public directory.

11. A matching directory system comprising a server and a database, wherein the server has a programmed processor adapted to:

collect social network connections for storage in the database, the social network connections comprising organisational or social network data associated with a user, and further collecting connection rules to determine whether or how a call should be routed;

receive a request from a caller to route a call to the user, the call request comprising organisational or social network data associated with the caller;

determining from the social network connections and the connection rules whether or how to provide call routing data in response to the request, wherein the connection rules comprise different levels of authority based on the social network connections; and if the server determines that a call should be routed according to the connection rules, causing the call to be routed between the user and the caller, wherein the step of determining from the social network connections and the connections rules whether or how to provide call routing data comprises selecting between a plurality of connection request outcomes, the outcomes including:

providing a one-time call number; and providing a permanent call number.

12. A method of routing a voice or video call, comprising:

receiving a request to route a call from a from a caller to a called party;

confirming that the caller and the called party are both members of a particular social network and determining a connection between the caller and the called party using social network connections comprising organizational or social network data associated with the called party;

determining from the connection and a set of connection rules whether or how to route the call from the caller to the called party; and routing the call from the caller to the called party if the connection between the caller and the called party satisfies criteria set by the connection rules, in a manner according to the connection rules wherein the connection rules comprise different levels of authority based on the connection and wherein the step of determining whether or how to route the call comprises selecting between a plurality of call request outcomes, the outcomes including:

providing a permanent contact number to the caller; and providing a one-time call number to the caller.

* * * * *